March 29, 1960  A. G. RICHARDSON  2,930,129
POSITIONAL ORIENTATION EVALUATOR
Filed June 13, 1956  2 Sheets-Sheet 1
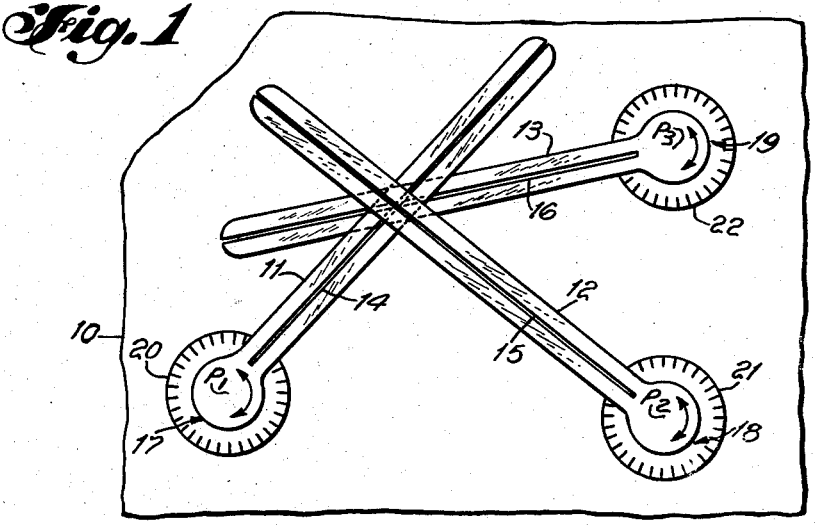
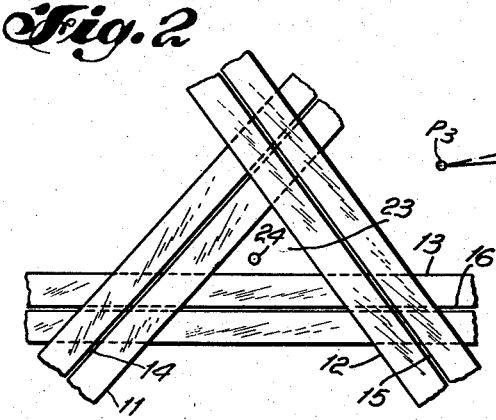
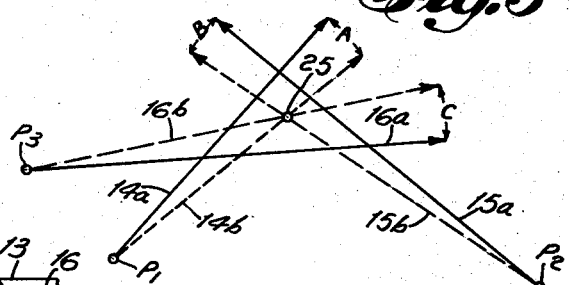
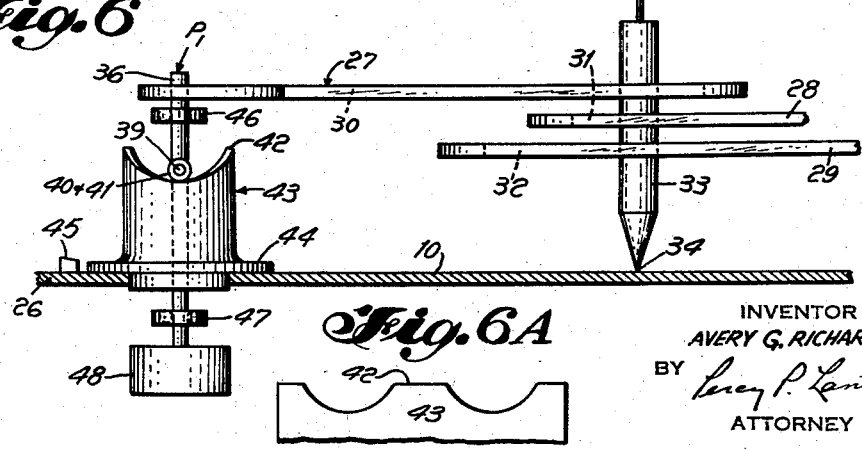
INVENTOR
AVERY G. RICHARDSON
BY
ATTORNEY

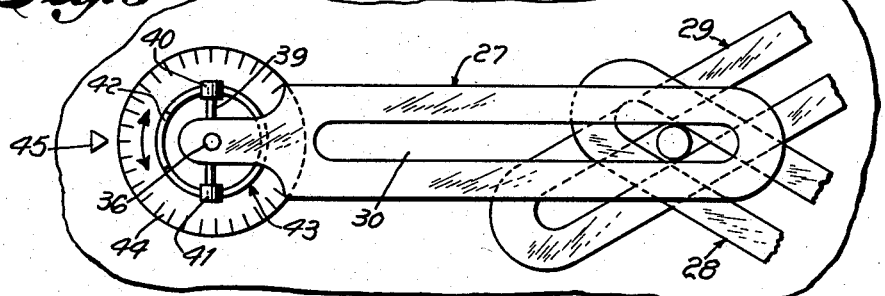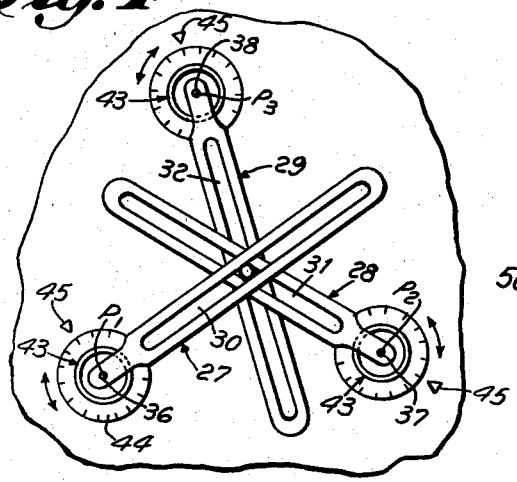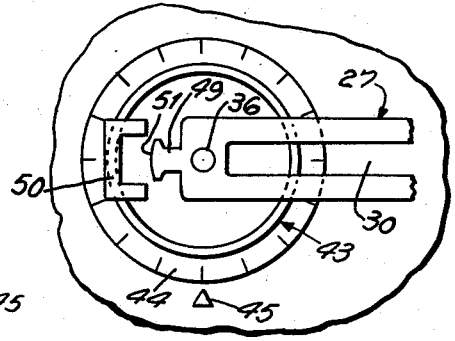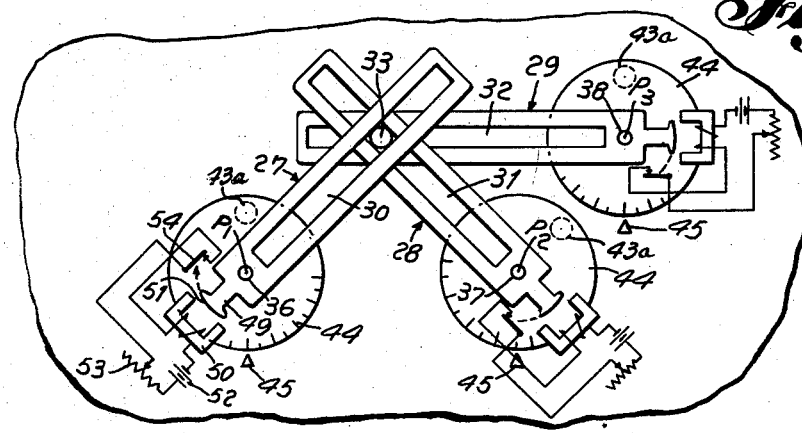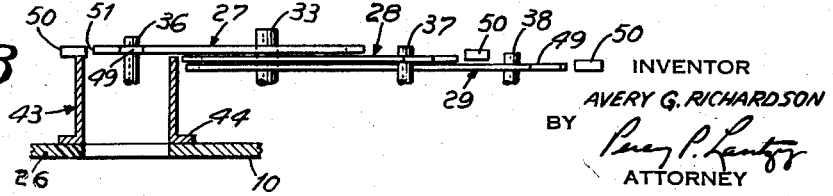

United States Patent Office 2,930,129
Patented Mar. 29, 1960

2,930,129

POSITIONAL ORIENTATION EVALUATOR

Avery G. Richardson, Boonton, N.J., assignor to International Telephone and Telegraph Corporation, Nutley, N.J., a corporation of Maryland Application June 13, 1956, Serial No. 591,093

8 Claims. (Cl. 33—1)

This invention relates to position and orientation determining systems and more particularly it relates to devices for accurately determining the location of an object by means of a plurality of bearings from geographically spaced points.

A principal object of the invention is to provide an improved position plotting mechanism for locating on a map or the like the position of an object relative to at least three geographically spaced points.

Another object is to provide an improved geometrical mechanical computer for solving triangulation problems and designed to be self-correcting for discrepancies between actual bearings and signal received bearings.

A feature of the invention relates to a plotting device having three or more pivotally mounted arms whose common intersection represents the geographical location of an object; in conjunction with additional means acting on each of the arms for increasing the accuracy of location of the probable fix corresponding to the object whose location is to be determined.

Another feature relates to a plotting device which is particularly well suited for use in direction finding systems where three or more bearing signals are used to determine a positional fix. The device includes at least three indicator arms pivotally mounted at the apices of a triangle and each capable of being angularly set in accordance with a corresponding bearing at which the arm assumes a rest position. Each arm engages a common indicating device which mutually cooperates with the settings of the control devices of the other arms so as to automatically and mechanically compute with greater precision the most probable fix determined by the relative intersection of the said arms.

A further feature relates to a mechanical plotter for direction finding systems and the like employing at least three pivoted arms mounted in triangular array, each of which can be moved individually to a rest position representing the bearing of a corresponding fix signal; each arm being mounted to exert a turning torque around its pivot, which torque is proportional to the square of the angle of the departure from its individual rest position when acted upon by the remaining arms, so as to correct automatically for received bearing signals which erroneously differ from the true bearing.

A further feature relates to the novel organization, arrangement, and relative location and interconnection of parts which together constitute by their conjoint action an improved positional plotter device.

Other features and advantages will appear from the following detailed description and the appended claims.

In the drawing,

Fig. 1 is a top plan view of a conventional positional plotting device;

Figs. 2 and 3 are explanatory diagrams of the manner in which the device of Fig. 1 is used for mathematically computing the most probable fix of an object whose location is to be determined;

Fig. 4 is a top plan view of a positional plotter according to the invention;

Fig. 5 is an enlarged view of part of Fig. 4;

Fig. 6 is an elevational view of Fig. 5; Fig. 6A is the cam development;

Fig. 7 is a top plan view of a modification of Fig. 4;

Fig. 8 is an elevational view of part of Fig. 7;

Fig. 9 is a magnified plan view of part of Fig. 7.

It is common practice in direction finding systems for obtaining a so-called fix, to employ a plotting device consisting for example of three individual pivoted arms, each of which is arranged to be angularly set in accordance with a respective bearing of a signal. The arms when so set are intended to provide a common intersection point which represents the location of the object whose fix is to be determined. For example the object may be an airplane or vessel which carries the plotting device and the bearing signals may be received as so-called radio direction finding signals which emanate from three or more spaced radio transmitters. In the ideal case, for example where there is no error in the received bearings, the three plotting arms will intersect in a point representing the desired fix. However if there is an angular error in one or more of the bearings, the setting of the plotter arms will not result in a point intersection, but will result in a triangular area of intersection wherein the most probable fix must be determined by complicated mathematical computations based upon successive trial fixes within that intersection area. In accordance with the present invention, such mathematical computations and fix trials are eliminated and the most probable fix is automatically obtained by the plotting mechanism itself.

Referring to Fig. 1 which illustrates one form of the invention, the numeral 10 represents a map which is supported on a suitable platen or table (not shown). Swingably mounted on the table at three triangularly related points P1, P2, P3 are three transparent arms 11, 12, 13, each of which carries an opaque or similar bearing indicator line 14, 15, 16. The pivot points P1, P2, P3 are located at the points on map 10 which represent the location, for example, of three separate radio transmitters to be used for direction finding purposes. Each arm carries a pointer 17, 18, 19 in alignment with its respective bearing indicator line 14, 15, 16. Attached to the support table in concentric position around each pivot point P1, P2, P3 is a corresponding graduated scale 20, 21, 22 with appropriate angular subdivisions representing bearing angles. Each of the three arms is individually rotated around its pivot until its pointer is in alignment with the particular angular setting on its scale representing the received bearing signal. The point where the three lines 14, 15, 16 intersect represents the location or fix of the object, which, for example, may be the aircraft or vessel which carries the plotting device.

However, in a considerable number of cases, one or more of the received direction finding or bearing signals may be erroneous, for example because of the lack of resolution or precision of the radio direction finder equipment on the aircraft or vessel. In such cases the lines 14, 15, 16 instead of intersecting in a point will define a triangular intersection area 23. The operator knows that the location or fix of the aircraft is somewhere within this triangular area. Heretofore in order to arrive at a more accurate location of the probable fix 24, it has been necessary to calculate mathematically for such most probable fix, which is taken to be the point which bears in some three directions from the three different transmitters so that the sum of the squares of the angular difference between the bearing to the most probable fix within the area 23 and the respective received signal bearings, is a minimum.

The usual manner of mathematical calculation is explained in connection with Fig. 3 of the drawing. On suitable graph paper or the like, the reported or signal received bearings are laid out, as indicated by the full lines 14a, 15a, 16a. Then a probable fix point 25 is assumed. Then an additional set of dotted lines 14b, 15b, 16b are drawn from the points P1, P2, P3 through the trial fix point 25. Angles A, B and C are then measured. The trial fix point 25 must then be moved about within the area 23 until the sum of $A^2+B^2+C^2$ is at a minimum which then gives the most probable position of the fix.

The present invention eliminates the above-noted time consuming mathematical and trial by error procedures by using a plotting mechanism which incorporates its own automatic computation or setting for the most probable fix. As shown in Figs. 4, 5 and 6 the device comprises a map 10 supported on a table or platen 26 which carries a set of three arms 27, 28, 29 each of which is pivotally mounted for swinging motion about its respective pivot point P1, P2, P3. Each of the arms has an elongated linear slot 30, 31, 32 in alignment with a respective pivot point. As shown in the elevational view of Fig. 6, the arms 27, 28 and 29 are so mounted that they swing in different horizontal planes and preferably the arms 27, 28, 29 are thinnest cross-section consonant with their required mechanical rigidity. Passing through the three slots 30, 31, 32 is a pointed tracer or stylus member 33 whose point 34 rides on the surface of map 10. The member 33 is suspended in a vertical direction so that its point 34 is capable of being moved freely in any desired horizontal direction across the surface of map 10. For example member 33 may be attached to the arm 35 of any well known pantograph device (not shown).

Each of the arms 27, 28, 29 is attached to a respective vertical shaft 36, 37, 38. Only one of these shafts, namely shaft 36, is shown in elevation in Fig. 6, but since the remaining two shafts 37, 38 and their manner of support are identical, the description of shaft 36 and its support is sufficient. Shaft 36 has rigidly attached thereto and extending equally in opposite directions therefrom a rigid arm 39 the ends of which are provided with rollers 40, 41. These rollers ride upon the specially cut track 42 in the upper edge of a tubular member 43 wherein the shaft 36 is concentrically mounted. The member 43 is rotatably mounted on the table 26 concentrically around the shaft 36 and is provided with a flat flange 44 having a series of graduated markings representing respective bearing directions. Also carried by the upper face of table 26 is a fixed pointer 45 for cooperation with the scale markings on flange 44. The shaft 36 is provided, above and below member 43, with ball bearings 46, 47 to permit the shaft to rotate freely and also to permit it to be raised and lowered in a vertical direction in accordance with the particular points of track 42 on which the rollers 40, 41 are in contact. The shaft 36 and its attached arm 27 is provided with a weight 48 to maintain the rollers 40, 41 at all times in engagement with the track 42. In accordance with the invention the upper surface of member 43 which forms the track 42 is cut with a curvature or camming surface having a slope angle approximately proportional to the square of the rotational angle between the rest position of shaft 36 and its non-rest position. Mathematically the slope is equal to the tangent of the said rotational angle squared. Somewhat greater or less slopes are operable. It should be observed that if the arm 27 is considered by itself without any other forces acting on it except the weight 48, no matter to what angular setting the member 43 is turned the shaft 36 will correspondingly turn until the rollers 40, 41 again assume the rest position where they are in engagement with the diametrically opposite low points of the track 42. In other words, the arm 27 will freely follow the turning of the member 43 and by itself will always assume a position in alignment with the adjusted bearing setting of the member 43.

The same action of course takes place for the remaining arms 28, 29 with the result that if the bearing signals are such that they correspond exactly with the true bearings, the three arms 27, 28, 29 will all be free from any substantial interaction since their respective rollers 40, 41 will all be in engagement with the low points of their respective tracks 42. This condition corresponds to the condition above described where the intersection of the lines 14, 15, 16 (Fig. 1) is in a theoretical perfect point.

On the other hand, if the bearings signals which are used to set the members 43 for the respective arms 27, 28, 29 are not in precise accord with the actual bearings, these arms will not be able to assume a point intersection with all arms in the rest position. Since some arms will be displaced from rest, there will be mutual mechanical forces acting between the arms. This is equivalent to disturbing one or more of the arms from their rest positions above described. As will be clear from the above described operation of the weighted shafts and the respective tracks 42, if any torque is applied to an arm tending to move it away from its rest position, its associated weight 48 is lifted by the action of the rollers 40, 41 on the track 42 resulting in a restoring torque tending to return the arm to its rest position, which torque is proportionate to the square of the angle of departure from such rest position. The net result is that the three arms and their associated supporting units interact to assume a final position which is equivalent to the computed most probable fix 25, as described above in connection with Fig. 3. In other words, the tracer member 33 assumes a position on map 10 which minimizes the square root of the sum of the squares of the angular deviations of the reported bearings from the bearings representing the most probable fix, thus eliminating the mathematical computations and trial by error procedures described above in connection with Fig. 3.

The invention is not limited to the particular manner of effecting automatic locating of the most probable fix. Thus there is shown in Figs. 7, 8 and 9 a modification wherein the fixating compensation is effected electromagnetically. The elements of Figs. 7 to 9 which are the same as those of Figs. 4 to 6 bear the corresponding designation numerals. In Fig. 7 the vertical cylindrical walls of element 43 have been omitted so that other features of the invention may be shown more clearly. However, instead of relying upon the weighted shafts 36 which are capable of vertical raising and lowering under control of a track and roller system, reliance is placed upon electromagnetic control for that purpose. Thus each arm 27, 28, 29 carries at its outer end a magnetic pole piece 49 adjacent which is mounted on the associated member 43 an electromagnet 50. The shaft 36 for each arm is supported concentrically within its member 43 in suitable bearings so that the shaft can be rotated without vertical shifting.

The face 51 of each pole piece 49 and the corresponding faces of the pole pieces of the magnet 50 are curved so that when the associated arm 27 for example is displaced around its pivot so as to be out of symmetrical alignment with the center line of its associated electromagnet, the said magnet exerts a restoring force or torque on the arm which is proportional to the square of the angle of such displacement.

To operate the device of Figs. 7 to 9, each scale on the flange 44 of the device 43 is turned to indicate the reported bearing. If there are no errors, each pole piece 49 will be centered on its associated electromagnet and there will be no forces acting on the arms so that their slots 30, 31, 32 will intersect in such a way that the vertical rod 33 indicates the true position of the fix. If, however, there are some errors in the received bearing signals, the forces acting on each arm 27, 28, 29 will tend to move them towards their respective center positions aligned with their respective electromagnets. The vertical rod 33 mechanically couples the three arms, and motion of the rod 33 results until that rod assumes a position at which the sum of the squares of the angles of departure of the said arms from their reported bearings is a minimum.

Preferably, each of the electromagnets is connected in circuit with a suitable source of direct current power represented schematically by the battery 52 in series with an adjustable resistor 53. This provides the operator with a control over the device so that if a radio bearing signal of poor quality is received the operator may desire to give it less weight in the operation of the device. To do this the operator may decrease the current through the appropriate electromagnet by some predetermined factor corresponding to such decrease in quality of the respective received bearing signal.

In some cases the bearing signal for any given unit may be so obviously wrong that it should not be considered. For example in the case of a so-called "wild" bearing. Under such circumstances the pole piece 49 of the corresponding arm will have passed beyond the control of its associated electromagnet and will exert negligible force upon the fix position of rod 33. As an alternative control there may be mounted on each member 43 a normally closed switch 54, the movable arm of which is adapted to be engaged by the pole piece 49 whenever the reported or signal received bearing is more than a predetermined number of degrees away from the appropriate fix. While the drawing shows one such switch 54 for each of the arms, which is opened when the associated arm assumes a setting in a cross-wise direction beyond the predetermined limit, it will be understood that a similar switch (not shown) may be provided to open the circuit of the electromagnet when the associated arm assumes a counterclockwise position beyond the predetermined limit.

Instead of using an electromagnet to provide the above-mentioned restoring force on each arm it can, if desired, be replaced by a permanent magnet which can be supported on its associated member 43 so as to be moved radially inwardly and outwardly with respect to the associated pole piece 49 so that the control of such permanent magnet on the associated arm can be manually changed by the operator to give less weight to poor quality received bearing signals.

It will be understood that the invention is not limited to the particular manner of supporting the members 43 and the associated concentric shaft 36 on the table 26. In the particular embodiments shown in Figs. 4 to 9 the lower ends of members 43 may be fitted into corresponding openings in the table 26 so as to form in effect a permanent attachment to the table. In certain cases, however, for example in mobile apparatus where location of direction finder stations on the map might change during the course of military operations, the members 43 and their associated elements can be anchored by placing the map 10 on an iron base plate and the members 43 at their lower ends may carry strong permanent magnets 43a so that they can be placed in any desired position on the map 10 readily and remain in that position by magnetic attraction to the iron base plate.

While the drawing illustrates a device employing three plotting arms, it is quite clear that a larger number of arms may be employed to take care of those cases in which a fix is more difficult to estimate, each arm and its associated support and restoring force control mechanism being provided for each one of a corresponding source of direction finder signals located at different geographical points which are represented on the map 10 as above described.

Other variations and modifications can be made in the disclosed embodiments without departing from the spirit and scope of the invention.

I claim:

1. A position plotting device comprising a set of at least three protractors adapted to be disposed at known locations on a map, each protractor having a rigid protractor arm pivotally supported thereon, a member coupled to said arms and movable thereby to any intersection point which is defined by a single true corresponding angular setting of said arms, said protractors being adjustable in accordance with bearing information of an object the fix of which is desired, and thereby to move said member to a fix point whose location on said map represents the location of said object, means automatically effective when any one of said protractors deviates from a true angular setting for automatically applying a torque conjointly to said arms constraining them to move said member to a location which represents the most probable fix of said object including rotatable shafts each of which is attached to a corresponding one of said arms, a scale member for each shaft concentrically surrounding it and rotatable therearound, and means individually movable with each scale member for causing the associated shaft and attached protractor arm to assume a predetermined rest position with respect to its associated scale.

2. A position plotting device comprising a set of at least three protractors adapted to be disposed at known locations on a map, each protractor having a rigid protractor arm pivotally supported thereon, a member coupled to said arms and movable thereby to any intersection point which is defined by a single true corresponding angular setting of said arms, said protractors being adjustable in accordance with bearing information of an object the fix of which is desired, and thereby to move said member to a fix point whose location on said map represents the location of said object, means automatically effective when any one of said protractors deviates from a true angular setting for automatically applying a torque conjointly to said arms constraining them to move said member to a location which represents the most probable fix of said object including rotatable shafts each of which is attached to a corresponding one of said arms, a roller individually carried by each shaft, an individual cam for each roller, means to maintain each roller in contact with its associated cam, and each said cam including means to constrain each roller to assume a predetermined rest position with respect to its associated cam in response to turning of said cam.

3. A position plotting device comprising a set of at least three protractors adapted to be disposed at known locations on a map, each protractor having a rigid protractor arm pivotally supported thereon, a member coupled to said arms and movable thereby to any intersection point which is defined by a single true corresponding angular setting of said arms, said protractors being adjustable in accordance with bearing information of an object the fix of which is desired, and thereby to move said member to a fix point whose location on said map represents the location of said object, means automatically effective when any one of said protractors deviates from a true angular setting for automatically applying a torque conjointly to said arms constraining them to move said member to a location which represents the most probable fix of said object including a plurality of rotatable shafts each of which is attached to one of said arms, a circular track concentrically surrounding each shaft, a roller carried by each shaft and riding on its associated track, each track having a curved contour with raised and lowered sections, means normally tending to maintain each roller in a rest position with respect to its track wherein it is in engagement with the lowered section thereof, the rise of each track between the lowered and raised sections thereof having a slope proportional to the square of the angular departure of the arm from its rest position and thereby producing said torque.

4. A fix determining mechanism for radio direction finding systems and the like wherein the fix of an object is determined by received bearing signals from three or more separate sources whose geographical locations are known, a map support, a set of three protractors each having a pivot shaft and a rigid protractor arm carried thereby, means supporting each shaft with its rotational axis located on said map at a point corresponding to the geographical location of a corresponding one of said sources, said arms being swingable in respective spaced planes parallel to the map support, an elongated slot in each arm, a fix tracing member passing through the slots in the three arms and whose position on said map is determined by the common intersection of said slots, scale means carried by each said protractor for each arm for setting it in accordance with a respective bearing signal from the corresponding one of said sources, and means effective when one of said arms is set with a deviation from a true bearing to cause the three arms to be subjected to an auxiliary torque whereby they assume a common rest position of intersection for moving said tracing member to a point which represents the most probable location of said fix on said map, and each of said shafts for the protractor arms is mounted substantially perpendicular to said map support for rotation around a vertical axis and is also arranged to be moved bodily in the direction of its length, and said last-named means includes means to control the rotation and vertical movement for each shaft, said control means including a circular track concentric around each shaft and having a camming surface with raised and lowered regions, a roller carried by each shaft and in riding contact with the associated cam track, means holding each roller against its associated track, each track having a rise between the lowered and raised regions which is proportional to the square of the angle of deviation between the arm setting which is different from the setting necessary to define with the remaining arms the true location of said fix on said map.

5. A fix determining mechanism for radio direction finding systems and the like wherein the fix of an object is determined by received bearing signals from three or more separate sources whose geographical locations are known, a map support, a set of three protractors each having a pivot shaft and a rigid protractor arm carried thereby, means supporting each shaft with its rotational axis located on said map at a point corresponding to the geographical location of a corresponding one of said sources, said arms being swingable in respective spaced planes parallel to the map support, an elongated slot in each arm, a fix tracing member passing through the slots in the three arms and whose position on said map is determined by the common intersection of said slots, scale means carried by each said protractor for each arm for setting it in accordance with a respective bearing signal from the corresponding one of said sources, and means effective when one of said arms is set with a deviation from a true bearing to cause the three arms to be subjected to an auxiliary torque whereby they assume a common rest position of intersection for moving said tracing member to a point which represents the most probable location of said fix on said map, and each of said arms carries adjacent its pivot shaft a magnetic pole piece, and a magnet is mounted for rotary movement with the associated scale means and in spaced relation to the corresponding pole piece.

6. A fix determining mechanism according to claim 5, in which means are provided for adjusting the strength of the magnetic field of each said magnet to control the effectiveness of said magnet on the associated pole piece.

7. A fix determining mechanism according to claim 5, in which each said magnet is an electromagnet and each electromagnet is provided with a circuit controlling switch which is operated to open the circuit of the electromagnet when the associated protractor arm diverges beyond a predetermined limit with respect to the magnetic axis of the electromagnet.

8. A fix determining mechanism for radio direction finding systems and the like wherein the fix of an object is determined by received bearing signals from three or more separate sources whose geographical locations are known, a map support, a set of three protractors each having a pivot shaft and a rigid protractor arm carried thereby, means supporting each shaft with its rotational axis located on said map at a point corresponding to the geographical location of a corresponding one of said sources, said arms being swingable in respective spaced planes parallel to the map support, an elongated slot in each arm, a fix tracing member passing through the slots in the three arms and whose position on said map is determined by the common intersection of said slots, scale means for each arm for setting it in accordance with a respective bearing signal from the corresponding one of said sources, said means to support said shafts including a cylinrdical member carrying said bearing scale means, each cylindrical member concentrically surrounding the corresponding shaft and being rotatably anchored on said map support, said map support being of magnetic material and each of said cylindrical members carrying a permanent magnet for anchoring it to said map support by magnetic attraction, and means effective when one of said arms is set with a deviation from a true bearing to cause the three arms to be subjected to an auxiliary torque whereby they assume a common rest position of intersection for moving said tracing member to a point which represents the most probable location of said fix on said map.

References Cited in the file of this patent

UNITED STATES PATENTS

| | | |
|---|---|---|
| 819,591 | Percy | May 1, 1906 |
| 1,965,098 | Eaton | July 3, 1934 |
| 2,171,561 | Hooven | Sept. 5, 1939 |
| 2,361,956 | Moseley | Nov. 7, 1944 |
| 2,396,141 | Adorjan et al. | Mar. 5, 1946 |
| 2,706,855 | White | Apr. 26, 1955 |
| 2,738,584 | Parker | Mar. 20, 1956 |